(12) United States Patent
Oikawa

(10) Patent No.: US 12,511,194 B2
(45) Date of Patent: Dec. 30, 2025

(54) MEMORY SYSTEM AND METHOD

(71) Applicant: Kioxia Corporation, Tokyo (JP)

(72) Inventor: Kohei Oikawa, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 7 days.

(21) Appl. No.: 18/761,725

(22) Filed: Jul. 2, 2024

(65) Prior Publication Data

US 2025/0013533 A1    Jan. 9, 2025

(30) Foreign Application Priority Data

Jul. 5, 2023  (JP) .................................. 2023-110657

(51) Int. Cl.
*G06F 11/10*   (2006.01)

(52) U.S. Cl.
CPC ...... *G06F 11/1068* (2013.01); *G06F 11/1012* (2013.01); *G06F 11/1016* (2013.01)

(58) Field of Classification Search
CPC ............. G06F 11/1068; G06F 11/1012; G06F 11/1016
USPC ................................ 714/764, 768, 773, 799
See application file for complete search history.

(56) References Cited

U.S. PATENT DOCUMENTS

| | | | | |
|---|---|---|---|---|
| 2008/0022182 | A1* | 1/2008 | Katayama | H03M 13/2906 714/752 |
| 2008/0046608 | A1 | 2/2008 | Lee et al. | |
| 2011/0131346 | A1 | 6/2011 | Noeldner et al. | |
| 2011/0258514 | A1* | 10/2011 | Lasser | H03M 13/2927 714/763 |
| 2012/0272123 | A1* | 10/2012 | Yeh | G06F 11/1044 711/E12.008 |
| 2014/0063955 | A1* | 3/2014 | Kawase | G11C 16/06 365/185.12 |
| 2021/0089392 | A1* | 3/2021 | Shirakawa | G06F 9/30134 |
| 2022/0046114 | A1 | 2/2022 | Entelis et al. | |
| 2023/0353395 | A1* | 11/2023 | Jonsson | G06F 1/3209 |
| 2025/0013533 | A1* | 1/2025 | Oikawa | G06F 11/1012 |

OTHER PUBLICATIONS

Unpublished U.S. Appl. No. 18/599,914, filed Mar. 8, 2024, 69 pages.

* cited by examiner

*Primary Examiner* — John J Tabone, Jr.
(74) *Attorney, Agent, or Firm* — Kim & Stewart LLP

(57) ABSTRACT

A memory system includes a nonvolatile memory device and a controller configured to generate page data of a first predetermined size, which includes a plurality of error correction frames, each of which has a second predetermined size, and write the generated page data into the nonvolatile memory device. The plurality of error correction frames includes a first error correction frame and a second error correction frame. The first error correction frame includes first data and a first error correction data for correcting the first data. The second error correction frame includes second data and a second error correction data for correcting the second data. The first error correction frame and the second error correction frame partially overlap with each other. An overlapping area of the first and second error correction frames includes a part of the first data and a part of the second data.

20 Claims, 16 Drawing Sheets

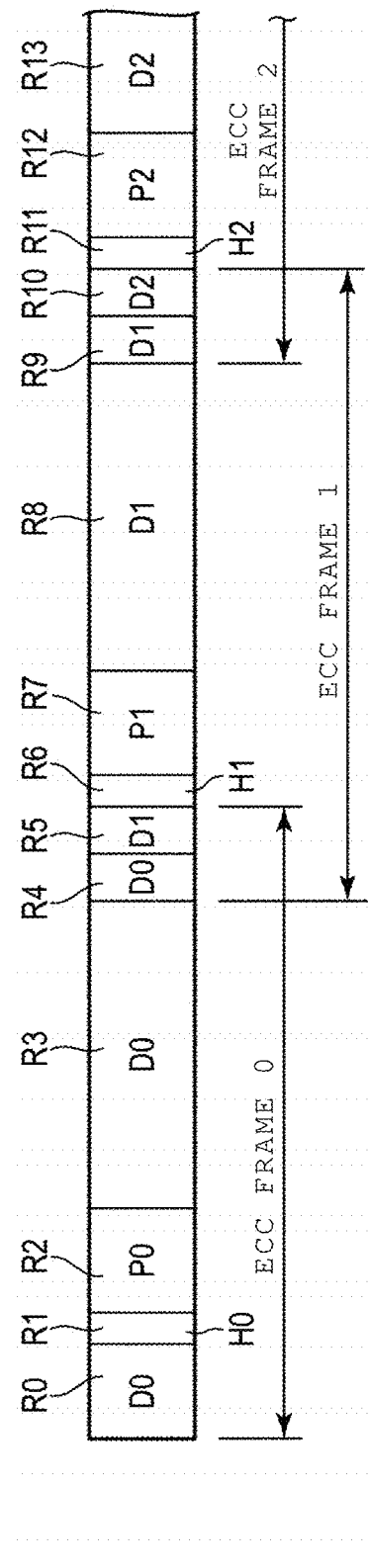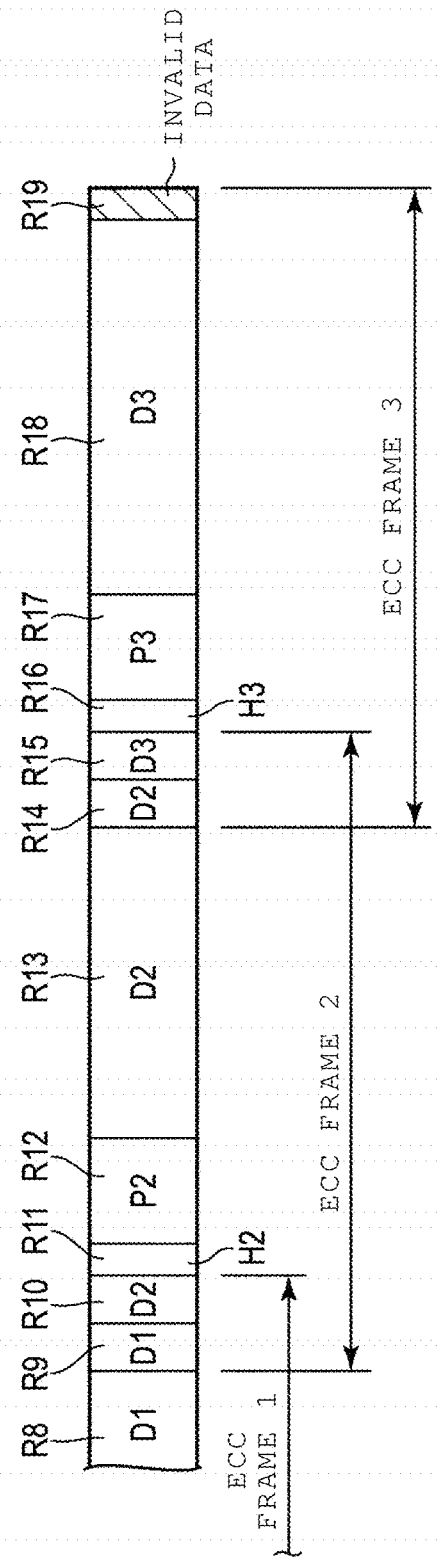

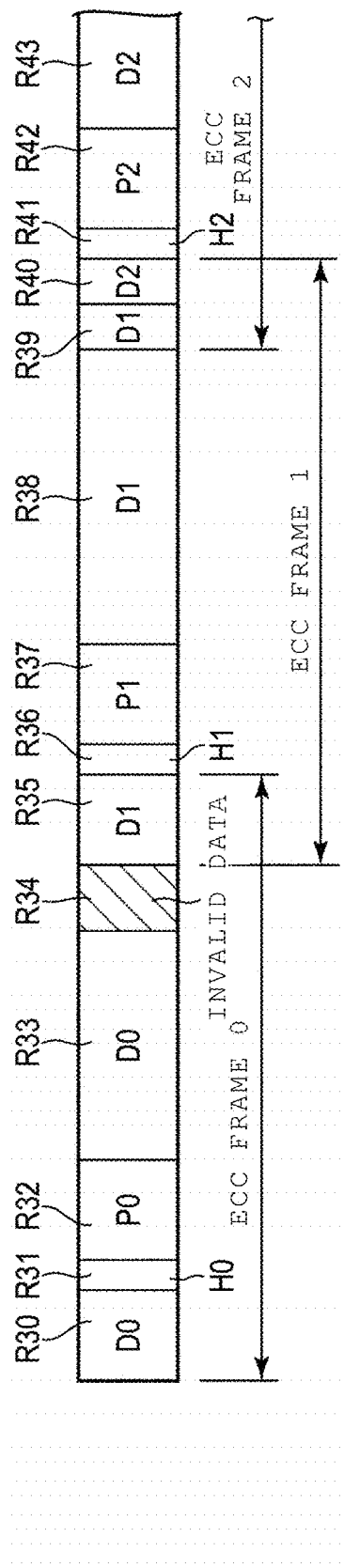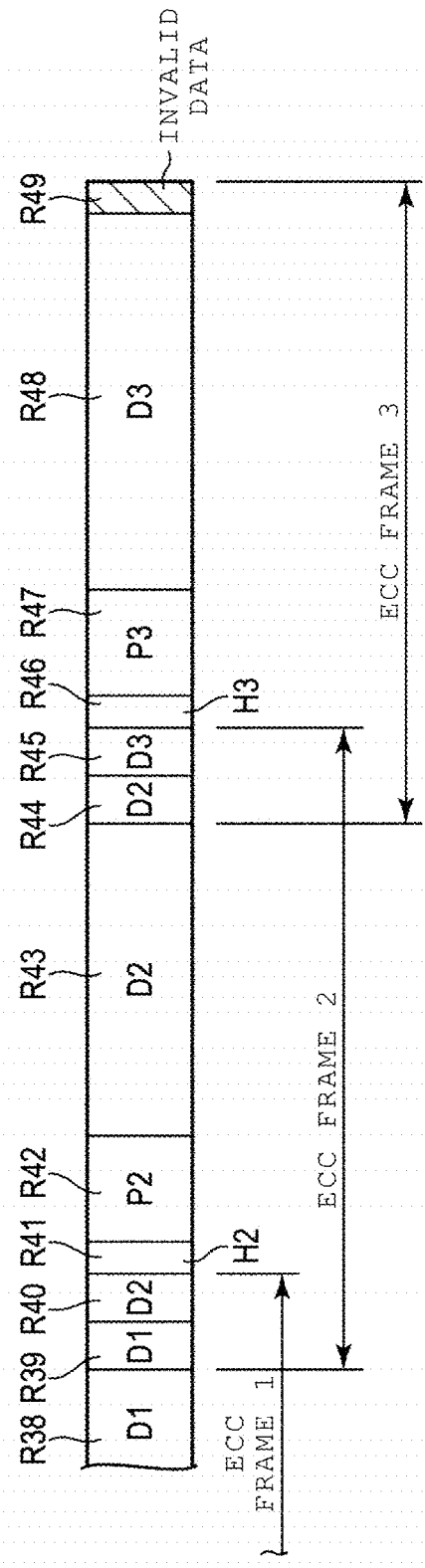

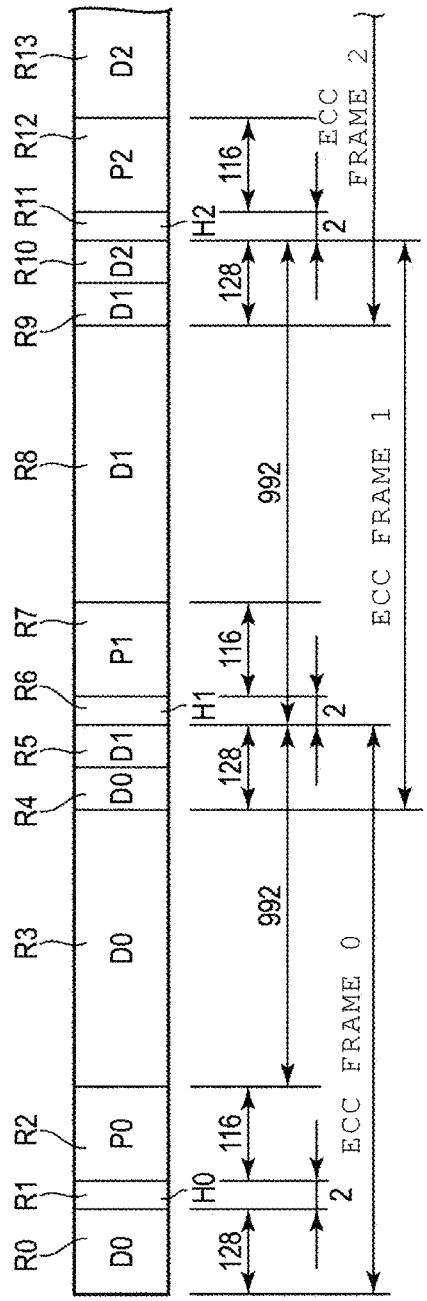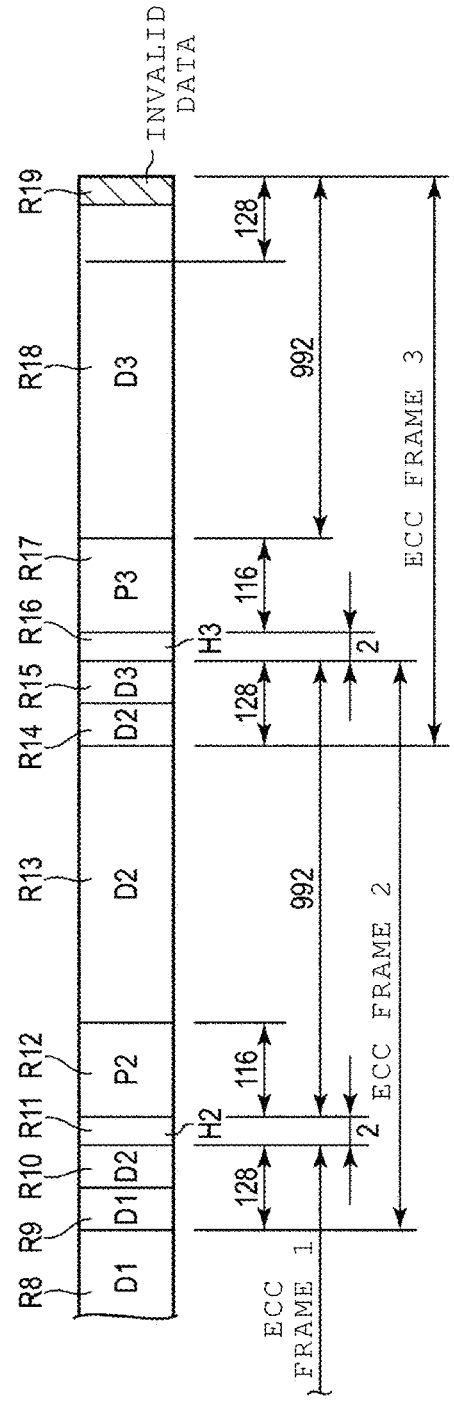

FIG. 8

| HOST ADDRESS | ECC FRAME ID | OFFSET |
|---|---|---|
| 0 | 4 | 6 |
| 1 | 4 | 7 |
| 2 | 5 | 0 |
| 3 | 8 | 4 |
| 4 | 1 | 2 |
| 5 | 2 | 3 |
| ⋮ | ⋮ | ⋮ |

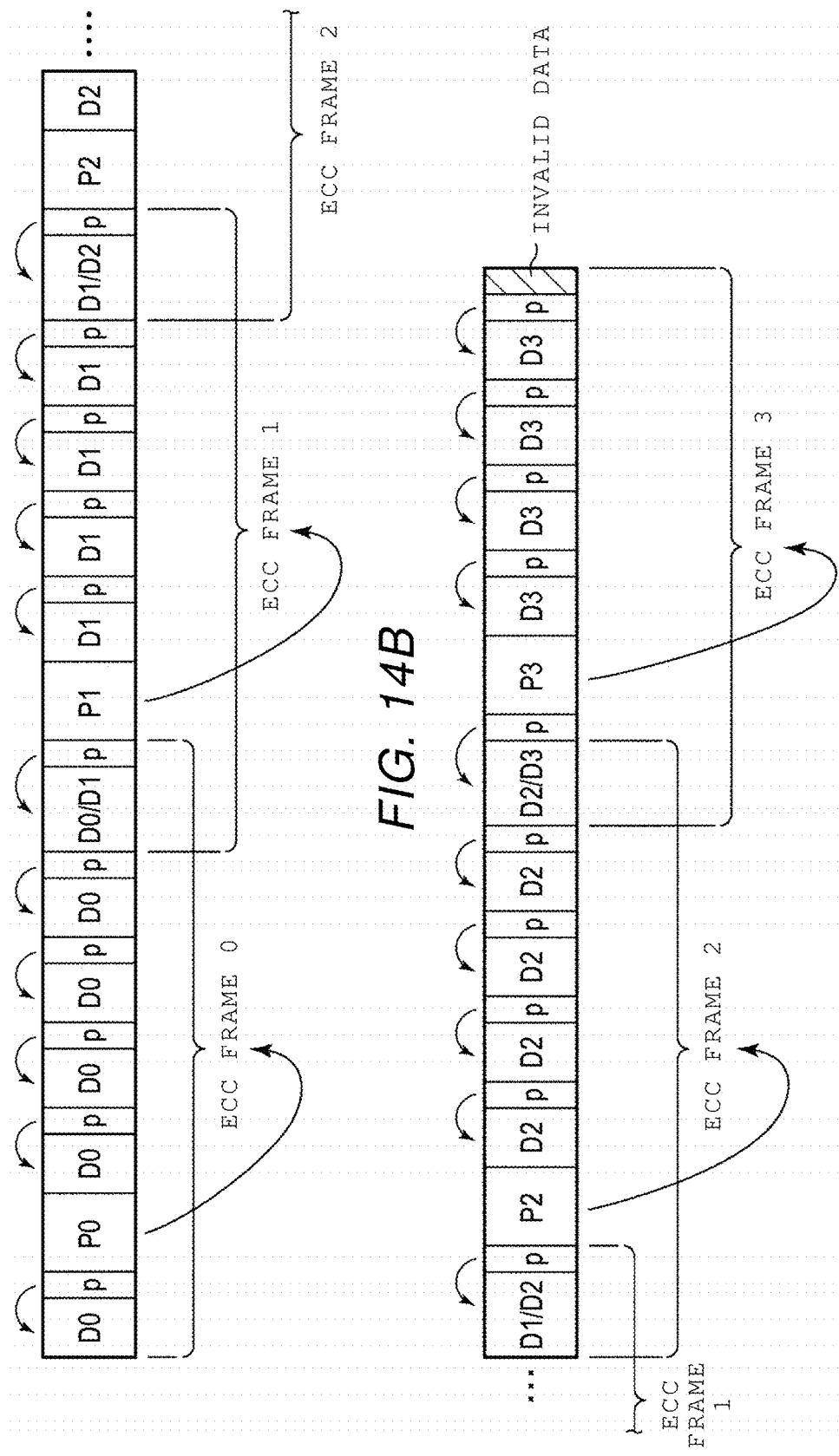

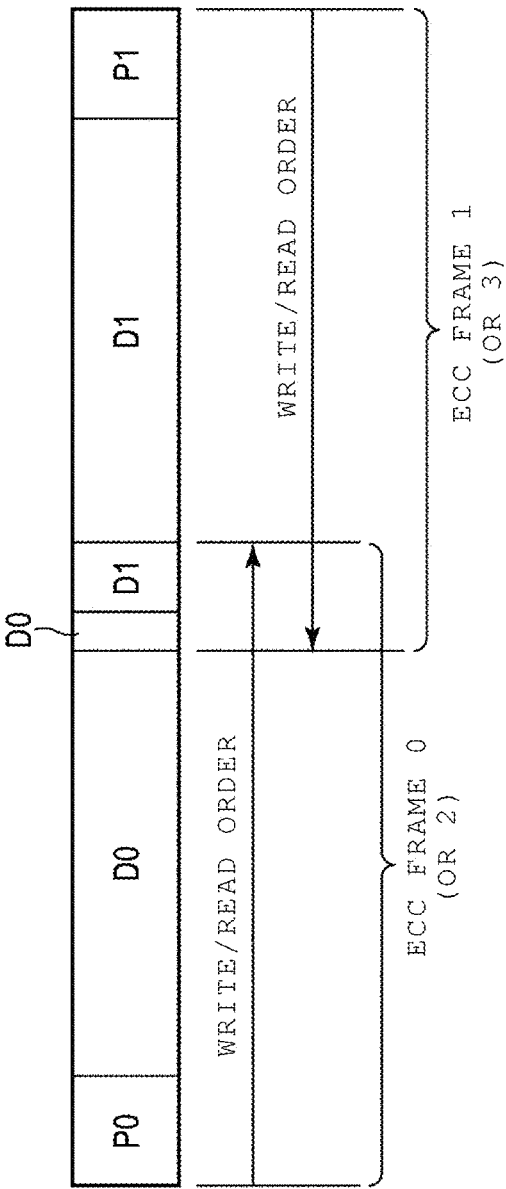

MEMORY SYSTEM AND METHOD

CROSS-REFERENCE TO RELATED APPLICATION

This application is based upon and claims the benefit of priority from Japanese Patent Application No. 2023-110657, filed Jul. 5, 2023, the entire contents of which are incorporated herein by reference.

FIELD

Embodiments described herein relate generally to a memory system and a method.

BACKGROUND

A memory system calculates, from data, a parity for error correction of the data. The memory system generates an error correction code (ECC) frame of a fixed size that includes the data and the parity. The memory system writes the ECC frame into a memory device.

The memory system may write variable-length data into the memory device. One example of the variable-length data is compressed data. When the variable-length data is written, the ECC frame may include invalid data depending on the size of the variable-length data.

BRIEF DESCRIPTION OF THE DRAWINGS

FIGS. 4A and 4B are diagrams illustrating an example of a configuration of ECC frames in the memory system according to the first embodiment.

FIGS. 5A and 5B are diagrams illustrating another example of the configuration of the ECC frames in the memory system according to the first embodiment.

FIGS. 6A and 6B are diagrams illustrating an example of specific sizes of the ECC frames in the memory system according to the first embodiment.

FIG. 8 is a diagram illustrating an example of an address conversion table according to the first embodiment.

FIGS. 14A and 14B are diagrams illustrating a specific example of a configuration of ECC frames in a memory system according to a second embodiment.

FIG. 15 is a diagram illustrating a specific example of a configuration of ECC frames in a memory system according to a third embodiment.

DETAILED DESCRIPTION

Figure 1:
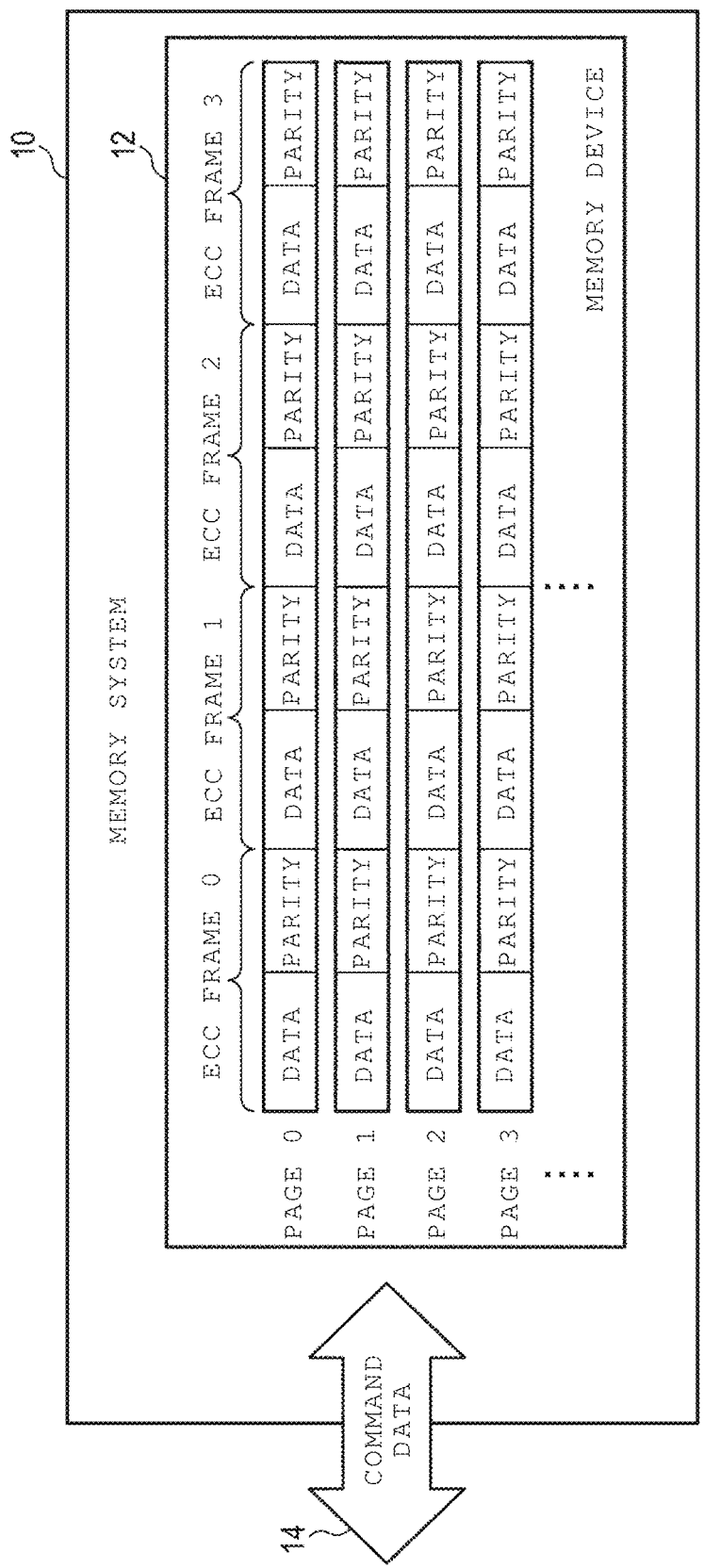
FIG. 1 is a diagram illustrating an example of a summary of a configuration of a memory system according to a first embodiment.

Embodiments provide a memory system and a method where a storage area is effectively used.

In general, according to an embodiment, a memory system includes a nonvolatile memory device and a controller configured to generate page data of a first predetermined size, which includes a plurality of error correction frames, each of which has a second predetermined size, and write the generated page data into the nonvolatile memory device. The plurality of error correction frames in the generated page data includes a first error correction frame and a second error correction frame subsequent thereto. The first error correction frame includes first data and a first error correction data for correcting the first data. The second error correction frame includes second data and a second error correction data for correcting the second data. The first error correction frame and the second error correction frame partially overlap with each other. An overlapping area of the first and second error correction frames includes a part of the first data and a part of the second data.

Hereinafter, embodiments will be described with reference to the drawings. The following description is an example of a device or a method for implementing the technical ideas of the embodiments, and the technical ideas of the embodiments are not limited in structures, shapes, arrangement, materials, and the like of components to those described below. Of course, modifications that can be easily conceived by those skilled in the art are included in the range of the disclosure. To clarify the description, in the drawings, the size, thickness, planar dimension, shape, or the like of each of elements may be changed from an actual embodiment and schematically illustrated. A plurality of drawings may also include elements having different dimensional relationships or ratios. In a plurality of drawings, corresponding elements are represented by the same reference numerals, and the repeated description may not be made. Some elements may be represented by a plurality of names. However, the names are merely examples, and the use of other names for the elements is not denied. The use of other names for elements that are not represented by a plurality of names is also not denied. In the following description, "connection" represents not only direct connection but also connection via another element.

First Embodiment

FIG. 1 is a diagram illustrating an example of the summary of a configuration of a memory system 10 according to a first embodiment. The memory system 10 includes a nonvolatile memory device 12. An example of the nonvolatile memory is a NAND flash memory. In the memory system 10, an interface 14 for exchanging a command and data with a host (not illustrated in FIG. 1) is provided.

The memory device 12 stores a plurality of pages. Each page includes a plurality of ECC frames. FIG. 1 illustrates an example where one page includes four ECC frames. The ECC frame includes data and a parity. Examples of sizes are as follows. The size of the data is 1024 bytes, the size of the parity is 118 bytes, the size of the ECC frame is 1142 bytes, and the size of the page is 4568 bytes.

The page may consist of a single ECC frame instead of a plurality of ECC frames.

During writing, the memory system 10 calculates a parity of 118 bytes from a plurality of (for example, 8 pieces) of units of data of 128 bytes (1024 bytes in total). The memory system 10 generates an ECC frame of 1142 bytes from the data and the parity, and writes the ECC frame into the memory device 12.

During reading, the memory system 10 reads the ECC frame from the memory device 12, and takes out the parity and the data from the ECC frame. The memory system 10 executes error correction of the data based on the parity. To reduce a memory usage or to improve a data transmission rate, the memory system 10 may compress data, and may write the compressed data into the memory device 12.

Figure 2:
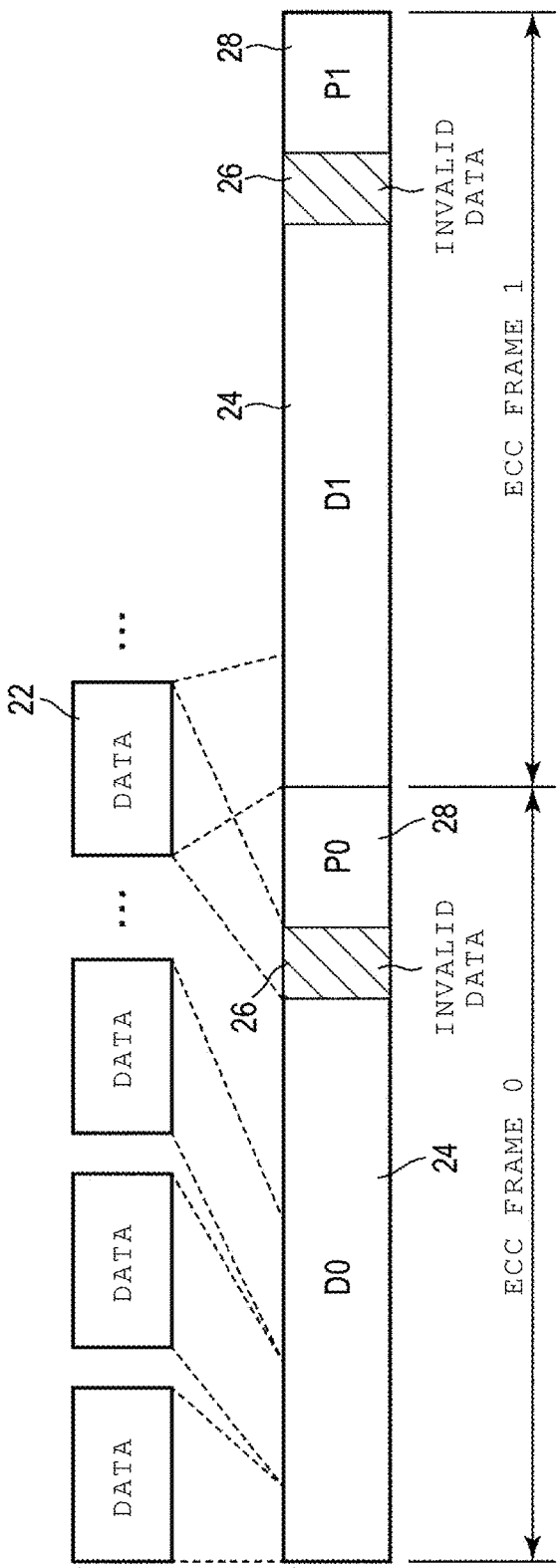
FIG. 2 is a diagram illustrating a comparative example of a configuration of ECC frames when a comparative memory system compresses data and writes the compressed data into a memory device.

FIG. 2 is a diagram illustrating a comparative example of a configuration of ECC frames when a comparative memory system compresses data and writes the compressed data into a memory device.

The ECC frame includes a data area 24, an invalid area 26, and a parity area 28. The data area 24 includes a data stream D. The data stream D corresponds to the data in FIG. 1. The invalid area 26 includes invalid data. An example of a size of each of the areas 24, 26, and 28 is as follows. The total size of the data area 24 and the invalid area 26 is 1024 bytes. The size of the parity area 28 is 118 bytes. The size of each of the data area 24 and the invalid area 26 is variable.

The comparative memory system compresses unit data of a fixed size, for example, 128 bytes, and adds at least one piece of compressed data into the data area 24 of an ECC frame 0 as the data stream D. An example of a compression method is a lossless compression method. In the lossless compression method, the compressed data has a variable-length size.

When the size of the data stream D exceeds 1024 bytes, that is, when the data area 24 has no free area, the comparative memory system stops adding the compressed data into the data area 24. Since the compressed data has a variable-length size, a timing when the data area 24 has no free area is generally a timing when a part of the compressed data has already been added into the data area 24.

For example, when the data area 24 has no free area at a timing at which a part of compressed data of unit data 22 has been added into the data area 24 of the ECC frame 0 as a data stream D0, the comparative memory system stops adding the compressed data. After stopping the adding, the comparative memory system adds the entirety of the compressed data of the unit data 22 into a head portion of the data area 24 of an ECC frame 1 as a data stream D1. Hereinafter, the comparative memory system sequentially adds the compressed data into the data area 24 of the ECC frame 1.

A part of the compressed data of the unit data 22 that is included in the data area 24 of the ECC frame 0 is invalid data that cannot be used even after being read later. When the adding of a part of the compressed data is stopped, the data area 24 including the invalid data is changed to the invalid area 26. The average size of the invalid area 26 varies depending on conditions and is, for example, about several tens of bytes per ECC frame. Therefore, several percentages of the storage area of the memory device may be the invalid area(s) 26.

The comparative memory system calculates a parity P0 based on the data stream D0 in the data area 24. The memory system 10 adds the parity P0 into the parity area 28.

Figure 3:
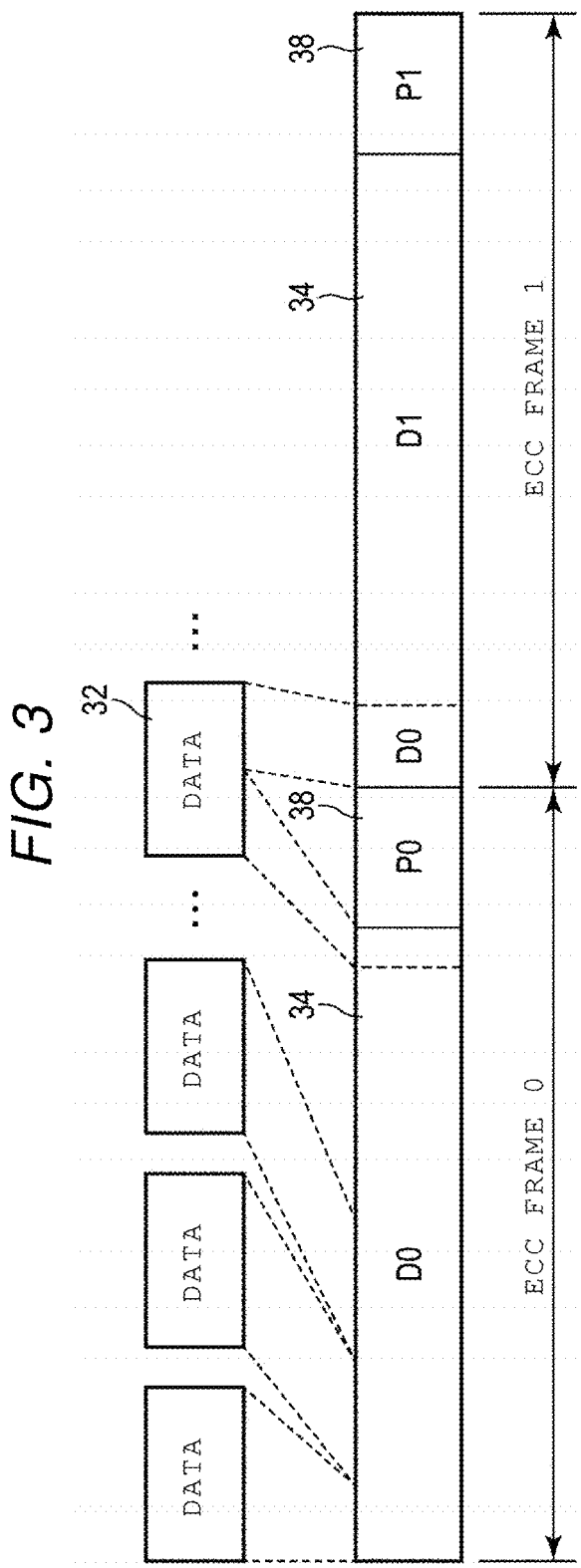
FIG. 3 is a diagram illustrating another comparative example of a configuration of ECC frames when a comparative memory system compresses data and writes the compressed data into the memory device.

FIG. 3 is a diagram illustrating another comparative example of a configuration of ECC frames when a comparative memory system compresses data and writes the compressed data into a memory device. A data compression method and sizes of data and each area are the same as those of the comparative example of FIG. 2.

An ECC frame other than a final ECC frame of a page includes a data area 34 of 1024 bytes and a parity area 38 of 118 bytes, and does include no invalid area. The final ECC frame of the page includes a data area of 1024 bytes, a parity area, and an invalid area.

The comparative memory system compresses data in units of 128 bytes, and adds at least one piece of compressed data of a variable-length size into the data area 34 as the data stream D.

When the size of the data stream D exceeds 1024 bytes, that is, when the data area 34 has no free area, the memory system 10 stops adding the compressed data into the data area 34.

For example, when the data area 34 has no free area at a timing at which a part of compressed data of data 32 has been added into the data area 34 of the ECC frame 0, the comparative memory system stops adding the compressed data into the data area 34 of the ECC frame 0. After stopping the adding, the comparative memory system adds the remaining part of the compressed data of the data 32 into a head portion of the data area 34 of the ECC frame 1 as the data stream D0. Hereinafter, the comparative memory system sequentially adds the compressed data into the data area 34 of the ECC frame 1.

The comparative memory system calculates the parity P0 based on the data area 34 of the ECC frame 0 and the data stream D0 in the data area 34 of the ECC frame 1. The comparative memory system adds the parity P0 into the parity area 38.

In the example of FIG. 2, the data area 24 of the ECC frame 1 includes the entirety of the compressed data of the unit data 22 of 128 bytes as the data stream D1. Therefore, each of the ECC frames includes the invalid area 26. In the example of FIG. 3, one piece of compressed data of the data 32 of 128 bytes is divided into two pieces of sub-compressed data. Each of the two ECC frames 0 and 1 includes two pieces of sub-compressed data as the data stream D0. The final ECC frame of the page may include an invalid area, but the other ECC frames include no invalid area. Therefore, the size of the invalid area in the example of FIG. 3 is less than the size of the invalid area in the example of FIG. 2.

However, in the example of FIG. 3, to read one piece of the unit data 32, two ECC frames may need to be read. Therefore, during data reading, the number of times of data communication with a host 32 increases, a band of the interface is more consumed, and the performance may be deteriorated.

FIGS. 4A and 4B are diagrams illustrating an example of a configuration of ECC frames in the memory system 10 according to the first embodiment.

Each page includes four ECC frames. Two adjacent ECC frames have an overlapping area. FIG. 4A illustrates an example of a configuration of ECC frames 0 and 1. FIG. 4B illustrates an example of a configuration of ECC frames 2 and 3.

The ECC frame 0 includes six areas R0 to R5. The size of each of the areas R0, R1, R2, and R3 is fixed. The total size of the areas R4 and R5 is fixed. The size of each of the areas R4 and R5 is variable. The size of the area R0 is the same as the total size of the areas R4 and R5.

The area R0 includes a head portion of the data stream D0. The area R1 includes a header H0. The header H0 represents an address of the memory device 12 corresponding to the head of the data stream D0. The area R2 includes the parity P0 of the data stream D0. The areas R3 and R4 include the data stream D0. The area R5 includes a head portion of the data stream D1.

The areas R4 and R5 are also included in the ECC frame 1 and are overlapping areas of the ECC frame 0 and the ECC frame 1. An end portion of the data stream D0 is added up to halfway (area R4) of the overlapping area. The data stream D1 is added from halfway (area R5) of the overlapping area.

The ECC frame 1 includes seven areas R4 to R10. The size of each of the areas R6, R7, and R8 is fixed. The total size of the areas R9 and R10 is fixed. The size of each of the areas R9 and R10 is variable. The total size of the areas R9 and R10 is the same as the total size of the areas R4 and R5.

The area R6 includes a header H1. The header H1 represents an address of the memory device 12 where the head of the data stream D1 is stored. The area R7 includes a parity P1 of the data stream D1. The areas R8 and R9 include the data stream D1. The area R10 includes a head portion of a data stream D2.

The areas R9 and R10 are also included in the ECC frame 2 and are overlapping areas of the ECC frame 1 and the ECC frame 2. An end portion of the data stream D1 is added up to halfway (area R9) of the overlapping area. The data stream D2 is added from halfway (area R10) of the overlapping area.

The ECC frame 2 includes seven areas R9 to R15. The size of each of the areas R11, R12, and R13 is fixed. The total size of the areas R14 and R15 is fixed. The size of each of the areas R9 and R10 is variable. The total size of the areas R9 and R10 is the same as the total size of the areas R4 and R5.

The area R11 includes a header H2. The header H2 represents an address of the memory device 12 corresponding to the head of the data stream D2. The area R12 includes a parity P2 of the data stream D2. The areas R13 and R14 include the data stream D2. The area R15 includes a head portion of a data stream D3.

The areas R14 and R15 are also included in the ECC frame 3 and are overlapping areas of the ECC frame 2 and the ECC frame 3. An end portion of the data stream D2 is added up to halfway (area R14) of the overlapping area. The data stream D3 is added from halfway (area R15) of the overlapping area.

The ECC frame 3 includes six areas R14 to R19. The size of each of the areas R16 and R17 is fixed.

The area R16 includes a header H3. The header H3 represents an address of the memory device 12 corresponding to the head of the data stream D3. The area R17 includes a parity P3 of the data stream D3. The area R18 includes the data stream D3. The area R19 is an invalid area including invalid data. The invalid area R19 corresponds to the invalid area 26 (FIG. 2).

The sizes of the areas R1, R6, R11, and R16 including the header are the same as each other. The sizes of the areas R2, R7, R12, and R17 including the parities are the same as each other. The total size of the overlapping areas R4 and R5, the total size of the overlapping areas R9 and R10, and the total size of the overlapping areas R14 and R15 are the same as each other.

The memory system 10 according to the first embodiment generates ECC frames such that some of adjacent ECC frames overlap each other. Each ECC frame includes the entirety of one data stream, and non-final ECC frames of one page do not include the invalid area R19. A boundary between a first data stream and a second data stream is positioned in the overlapping area. As a result, the invalid area of the memory device can be reduced without increasing the number of times of data transmission during reading.

All the boundaries between the two data streams do not need to be positioned in the overlapping areas. At least one of the boundaries between the two data streams does not need to be positioned in the overlapping area. FIGS. 5A and 5B are diagrams illustrating another example of the configuration of the ECC frames in the memory system 10 according to the first embodiment.

Each page includes four ECC frames. Two adjacent ECC frames have an overlapping area. FIG. 5A illustrates an example of a configuration of the ECC frames 0 and 1. FIG. 5B illustrates an example of a configuration of the ECC frames 2 and 3.

The ECC frame 0 includes six areas R30 to R35. The size of each of the areas R30, R31, R32, and R35 is fixed. The sizes of the areas R33 and R34 are variable. The size of the area R30 is the same as the size of the area R35.

The area R30 includes a head portion of the data stream D0. The area R31 includes the header H0. The header H0 represents an address of the memory device 12 corresponding to the head of the data stream D0. The area R32 includes the parity P0 of the data stream D0. The area R33 includes the data stream D0. The area R34 includes invalid data. The invalid area R34 corresponds to the invalid area 26 (FIG. 2).

The area R35 is also included in the ECC frame 1 and is an overlapping area of the ECC frame 0 and the ECC frame 1. The overlapping area R35 includes the head portion of the data stream D1 of the ECC frame 1 without including the data stream D0 of the ECC frame 0.

The ECC frame 1 includes six areas R35 to R40. The total size of the areas R36 and R37 is fixed. The size of the area R38 is variable. The total size of the areas R39 and R40 is fixed. The total size of the areas R36 and R37 is the same as the size of the area R35.

The area R36 includes the header H1. The header H1 represents an address of the memory device 12 corresponding to the head of the data stream D1. The area R37 includes the parity P1 of the data stream D1. The area R38 includes the data stream D1.

The areas R39 and R40 are also included in the ECC frame 2 and are overlapping areas of the ECC frame 1 and the ECC frame 2. An end portion of the data stream D1 is added up to halfway (area R39) of the overlapping area. The data stream D2 is added from halfway (area R40) of the overlapping area.

The ECC frame 2 includes seven areas R39 to R45. The size of each of the areas R41, R42, and R43 is fixed. The total size of the areas R44 and R45 is fixed. The size of each of the areas R44 and R45 is variable. The total size of the areas R39 and R40 is the same as the total size of the areas R44 and R45.

The area R41 includes the header H2. The header H2 represents an address of the memory device 12 where the head of the data stream D2 is stored. The area R42 includes the parity P2 of the data stream D2. The areas R43 and R44 include the data stream D2. The area R45 includes the head portion of the data stream D3.

The areas R44 and R45 are also included in the ECC frame 3 and are overlapping areas of the ECC frame 2 and the ECC frame 3. An end portion of the data stream D2 is added up to halfway (area R44) of the overlapping area. The data stream D3 is added from halfway (area R45) of the overlapping area.

The ECC frame 3 includes six areas R44 to R49. The size of each of the areas R46 and R47 is fixed. The total size of the areas R48 and R49 is fixed. The size of each of the areas R48 and R49 is variable.

The area R46 includes the header H3. The header H3 represents an address of the memory device 12 corresponding to the head of the data stream D3. The area R47 includes the parity P3 of the data stream D3. The area R48 includes the data stream D3. The area R49 is an invalid area including invalid data. The invalid area R49 corresponds to the invalid area 26 (FIG. 2).

The sizes of the areas R31, R36, R41, and R46 including the header are the same as each other. The sizes of the areas R32, R37, R42, and R47 including the parity are the same as each other. The size of the overlapping area R35, the total size of the overlapping areas R39 and R40, and the total size of the overlapping areas R44 and R45 are the same as each other.

In the example of FIGS. 5A and 5B, the overlapping area R35 of the ECC frame 0 and the ECC frame 1 does not include the data stream D0 of the ECC frame 0 and does not include the head portion of the data stream D1 of the ECC frame 1. Therefore, the invalid area R34 is generated in the ECC frame 0.

When the probability that a boundary between two data streams is positioned in the overlapping area increases, the size of the invalid area is small. When all the boundaries between the two data streams are positioned in the overlapping areas, the size of the invalid area is the smallest. To implement the ECC frames of FIGS. 4A and 4B, when the number of pieces of compressed data increases by one, the amount of increase in the size of the data stream (in other words, the amount of decrease in the free size of the data area) only needs to be less than or equal to the size of the overlapping area. When uncompressed data is in units of 128 bytes, the maximum size of compressed data can be 128 bytes plus 1 bit. When the number of pieces of compressed data increases by one, the maximum value of the amount of increase in the size of the data stream is 128 bytes plus 1 bit. Therefore, as long as the size of the overlapping area of the ECC frames is set to 128 bytes plus 1 bit, the ECC frames of FIGS. 4A and 4B are generated. Even with the size of 128 bytes, the ECC frames of FIGS. 4A and 4B are generated with high probability.

When the size of the overlapping area increases, the size of the parity area also increases. Therefore, the size of the data area decreases. As the size of the overlapping area decreases less than 128 bytes, the ECC frames of FIGS. 5A and 5B are generated with high probability.

In the examples of FIGS. 4A to 5B, the areas other than the overlapping areas, for example, the areas R1, R6, R11, and R16 include the header. However, the overlapping area may include the header depending on the performance and the cost required for the memory system. For example, the head or the end of the overlapping area may include the header. A memory device other than the memory device that stores data may include the header.

Formats (the size/storage location of the data stream, the size/storage location of the parity, and the like) of four ECC frames that partially overlap with adjacent ECC frames may be the same as or different from each other. When the formats are the same, plural types of parity generation processes or error correction processes are not necessary, and only one type of parity generation process or error correction process may be used.

In the memory system 10 according to the first embodiment, when variable-length data such as compressed data is stored, the invalid area can be reduced. In the comparative example illustrated in FIG. 2, each of the ECC frames includes one invalid area. However, in the first embodiment illustrated in FIGS. 4A and 4B, four frames (page) include one invalid area. Therefore, the number of invalid areas can be reduced to about ¼, and the size of the data stream can be increased.

In the first embodiment illustrated in FIGS. 4A to 5B, even when any unit data (128 bytes) is sent to the host, the number of ECC frames that is required to be decoded and decompressed is one. In the comparative example illustrated in FIG. 3, a plurality of (generally, two; however, when the size of the unit data is large, three or more) ECC frames include one piece of compressed data of unit data. To obtain one piece of unit data, a plurality of ECC frames may need to be decoded and decompressed. In the first embodiment illustrated in FIGS. 4A to 5B, only one ECC frame needs to be decoded and decompressed to obtain one piece of unit data. In the first embodiment illustrated in FIGS. 4A to 5B, as compared to the comparative example illustrated in FIG. 3, the number of times of data communication with the host 32 during data reading is reduced, the consumption of the band of the interface is reduced, and the performance is improved.

The advantage of the first embodiment will be described using specific values. FIGS. 6A and 6B are diagrams illustrating an example of specific sizes of the ECC frames in the memory system 10 according to the first embodiment. In FIGS. 6A and 6B, the size (unit: byte) is filled in each of the regions of FIGS. 4A and 4B.

It is assumed that the storage area of the memory device 12 illustrated in FIG. 1 includes a page (4568 bytes) including four ECC frames. It is assumed that the size of the data area of the ECC frame is 1024 bytes. It is assumed that the memory system 10 compresses one unit data (128 bytes) and generates a data stream from a plurality of pieces of compressed data. It is assumed that the error correction capability required for the memory system 10 is 60 bits per ECC frame. When a BCH code is used as the ECC, a code that satisfies the following relationship can be implemented, where p (bit) represents the size of the parity, k (bit) represents the size of the compressed data, and t represents the number of correctable bits per ECC frame (m represents an integer).

$$p = mt \qquad \text{Expression 1}$$

$$k < 2^m - p \qquad \text{Expression 2}$$

Here, t=60, and k=8192 (=1024×8). The minimum value of m that satisfies Expressions 1 and 2 is 14. Based on Expression 1, the minimum value of the parity bit length p is 840 bits (105 bytes). The minimum value of the size required for four ECC frames is 4516 (=(1024+105)×4) bytes. The size of four ECC frames has surplus 52 bytes compared to the page size (4568 bytes). In the comparative example illustrated in FIG. 2, simply by increasing the size of the ECC frame, the storage capacity can be improved by about 52 bytes per page.

Next, the improvement of the storage capacity according to the first embodiment will be described. In the ECC frames according to the first embodiment, compared to the ECC frames illustrated in FIG. 3, the size of the overlapping area (128 bytes that is the same as the data unit) and the size of the header (2 bytes) are increased, and the size of the ECC frames is increased. Therefore, the error correction capability needs to be increased correspondingly. FIGS. 6A and 6B illustrate an example of the configuration of the ECC frames where the size of the parity is increased as much as possible to improve the error correction capability while maintaining the total data size per page to be 4096 bytes.

It is assumed that the size of the ECC frame is 1238 bytes (data: 1120 bytes+header: 2 bytes+parity: 116 bytes). The number of correctable bits is 66 bits (=p/m=116×8/14). The number of correctable bits (66 bits) is 1.1 (=6.6/6.0) times of 60 bits that is the original number of bits. An increase rate in the number of correctable bits corresponds to an increase rate of 1.097 (=1238/1129) in the size of the ECC frames.

It is assumed that the average size per invalid area is 40 bytes. In the comparative example illustrated in FIG. 2, the size of the invalid area per page is 160 bytes. In the first embodiment illustrated in FIGS. 6A and 6B, the size of the invalid area per page is 40 bytes. The size of the invalid area according to the first embodiment illustrated in FIGS. 6A and 6B is reduced by 120 bytes as compared to the comparative example illustrated in FIG. 2. That is, it can be said that the storage capacity is improved by 120 bytes. The amount of improvement of the storage capacity in the comparative example illustrated in FIG. 2 is 52 bytes. Therefore, in the first embodiment, it can be said that the storage capacity can be improved by 68 bytes (=120-52) per page (data: 4096 bytes) as compared to the comparative example.

Figure 7:
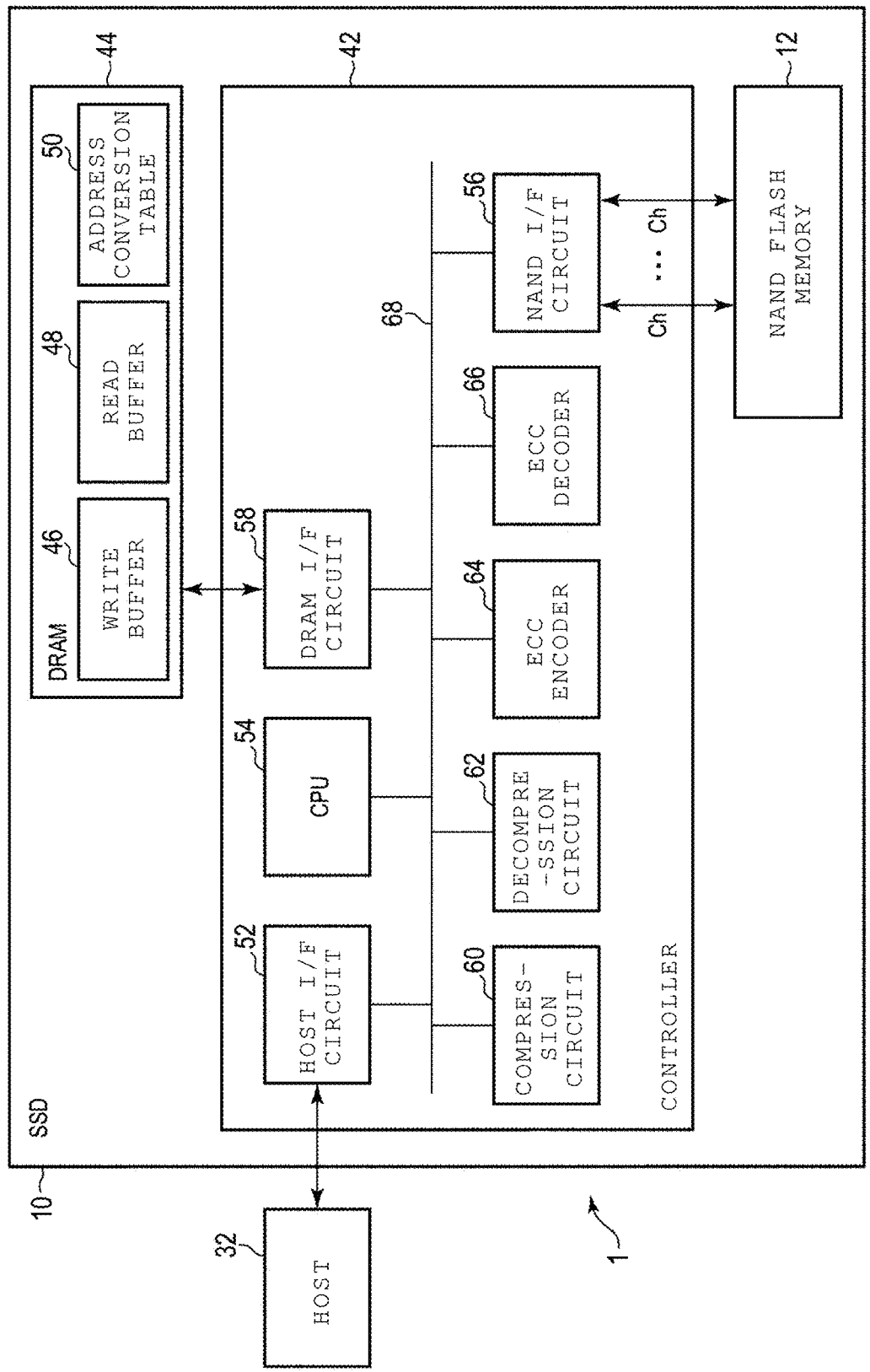
FIG. 7 is a diagram illustrating an example of an information processing system according to the first embodiment.

FIG. 7 is a diagram illustrating an example of an information processing system 1 according to the first embodiment. The information processing system 1 includes the memory system 10 and the host 32.

The host 32 is an information processing apparatus that accesses the memory system 10. The memory system 10 may be used as a main storage of the host 32. The memory system 10 may be built in the host 32, or may be provided outside the host 32 and connected to the host 32 via a cable or a network. The host 32 may be a server (e.g., storage server) that stores a large amount of various types of data in the memory system 10. The host 32 may be a personal computer. The memory system 10 may be a system for business use that is incorporated into a server of a data center or the like. The memory system 10 may be a system for personal use that is incorporated into a personal computer. Examples of the memory system 10 include a solid state drive (SSD) and a hard disk drive (HDD). In the following, the memory device 12 will be referred to as the NAND flash memory 12.

The memory system 10 includes the NAND flash memory 12, a dynamic random access memory (DRAM) 44, and a controller 42. Instead of the NAND flash memory 12, a NOR flash memory, a magneto-resistive random access memory (MRAM), a phase change random access memory (PRAM), a resistive random access memory (ReRAM), or a ferroelectric random access memory (FeRAM) may be used. The NAND flash memory 12 includes a memory cell array including a plurality of memory cells that are arranged in a matrix configuration. The memory cell array may have a two-dimensional structure or a three-dimensional structure.

The DRAM 44 is an example of a volatile memory. The DRAM 44 is, for example, a DRAM based on a double data rate 3 low voltage (DDR3L) specification. The DRAM 44 includes a write buffer 46, a read buffer 48, and an address conversion table 50. Data that is supplied from the host 32 to the memory system 10 and is being written into or is not written into the NAND flash memory 12 is stored in the write buffer 46. Data that is read from the NAND flash memory 12 and is being transmitted to or is not transmitted to the host 32 is stored in the read buffer 48. The DRAM 44 functions as a temporary buffer for data that is used during the operation of the memory system 10 or software that is executed in the controller 42. The DRAM 44 may be provided in the controller 42 without providing the outside of the controller 42. As the volatile memory, a static random access memory (SRAM) capable of high-speed access may be used instead of the DRAM 44.

According to a command transmitted from the host 32, the controller 42 compresses data transmitted from the host 32 and writes the compressed data into the NAND flash memory 12, or reads compressed data from the NAND flash memory 12 and decompresses the read data. The controller 42 may be configured with a circuit such as a system on a chip (SoC). The controller 42 controls an operation of the memory system 10. The controller 42 includes a host interface (referred to as a host I/F circuit) 52, a CPU 54, a NAND interface (referred to as a NAND I/F circuit) 56, a DRAM interface (referred to as a DRAM I/F circuit) 58, a compression circuit 60, a decompression circuit 62, an ECC encoder 64, and an ECC decoder 66.

The host I/F circuit 52 communicates with the host 32. The communication with the host 32 is based on, for example, PCI Express® specification. The host I/F circuit 52 receives a command from the host 32.

The NAND I/F circuit 56 is a memory control circuit that controls the NAND flash memory 12 under the control of the CPU 54. The NAND I/F circuit 56 and the NAND flash memory 12 are connected to each other via a plurality of channels Ch. The NAND flash memory 12 includes a plurality of memory chips. The plurality of memory chips are connected to the channels, respectively.

The DRAM I/F circuit 58 is a DRAM control circuit that controls the DRAM 44 under the control of the CPU 54.

The compression circuit 60 compresses data transmitted from the host 32 using a lossless compression method. The compressed data is variable-length data. The ECC encoder 64 generates an ECC frame from the compressed data. The NAND I/F circuit 56 writes ECC frames of one page into the NAND flash memory 12.

The NAND I/F circuit 56 reads page data including a target ECC frame from the NAND flash memory 12. The ECC decoder 66 executes an error correction process of the compressed data extracted from the ECC frame. The decompression circuit 62 decompresses the compressed data on which the error correction process is executed using a lossless decompression method. The host I/F circuit 52 transmits the decompressed data to the host 32.

Some or all of the compression circuit 60, the decompression circuit 62, the ECC encoder 64, and the ECC decoder 66 may be implemented by the CPU 54 executing firmware. Some or all of the compression circuit 60, the decompression circuit 62, the ECC encoder 64, and the ECC decoder 66 may be provided outside the memory system 10. The outside of the memory system 10 is, for example, the host 32 or a server to which the host 32 is further connected.

FIG. 8 is a diagram illustrating an example of the address conversion table 50 according to the first embodiment. The address conversion table 50 stores: an ECC frame ID corresponding to a host address; and information (referred to as an offset) of a head location of a data area in the ECC frame identified with the ECC frame ID.

Figure 9:
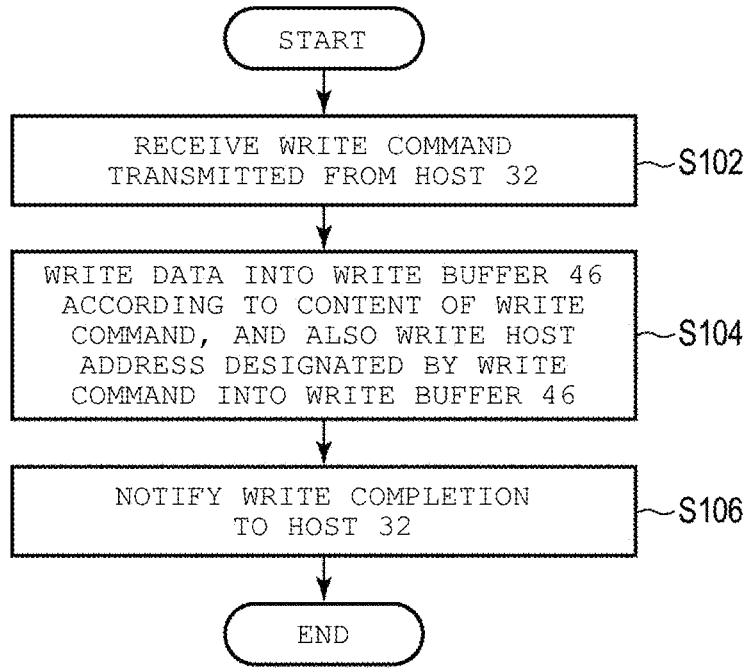
FIG. 9 is a flowchart illustrating an example of a write process according to the first embodiment.

FIG. 9 is a flowchart illustrating an example of a write process according to the first embodiment. The write process illustrated in FIG. 9 is executed each time a write command is issued from the host 32.

The CPU 54 receives the write command transmitted from the host 32 (S102).

The CPU 54 writes write data into the write buffer 46 according to the content of the write command, and also writes a host address designated by the write command into the write buffer 46 (S104). The write data is data in units of a predetermined size. The predetermined size is, for example, 128 bytes.

The CPU 54 notifies write completion to the host 32 (S106), and ends the process. The notification may be skipped.

Figure 10:
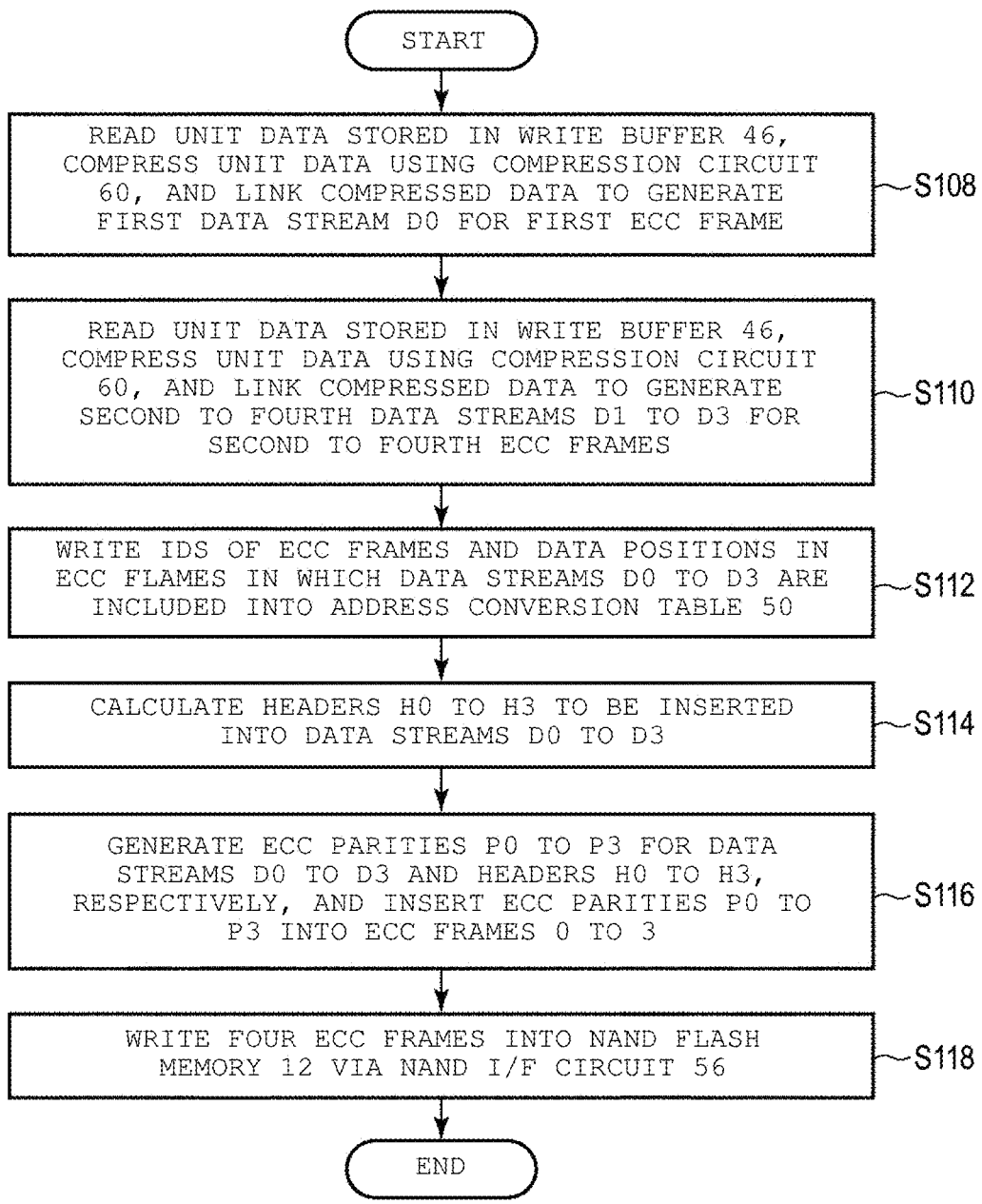
FIG. 10 is a flowchart illustrating the example of the write process according to the first embodiment.
Figure 11:
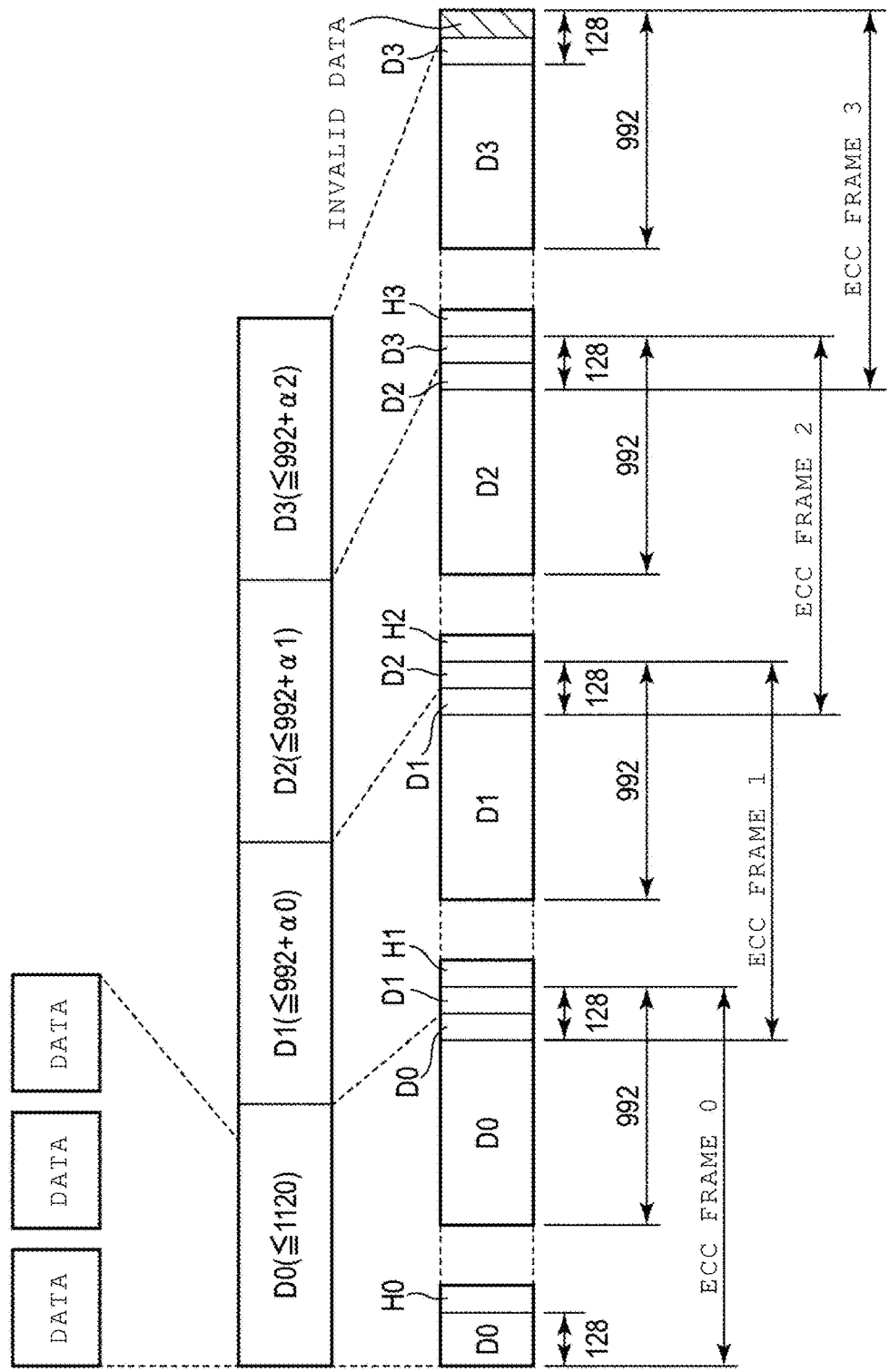
FIGS. 11A to 11C are diagrams illustrating an example of generating ECC frames according to the first embodiment.

FIG. 10 is a flowchart illustrating the example of the write process according to the first embodiment. When data for four ECC frames is stored in the write buffer 46, the write process illustrated in FIG. 10 is executed once. FIGS. 11A to 11C are diagrams illustrating an example of generating ECC frames according to the first embodiment.

The CPU 54 reads the unit data stored in the write buffer 46, compresses the unit data using the compression circuit 60, and links a plurality of pieces of compressed data to generate a first data stream D0 for a first ECC frame (S108). FIG. 11A illustrates an example of the unit data read from the write buffer 46.

When the first unit data is read, the CPU 54 sets the compressed data as the data stream D0. When the second or subsequent unit data is read, the CPU 54 adds the compressed data to the data stream D0, and sets the addition result as a new data stream D0.

The CPU 54 generates the data stream such that the compressed data of the unit data of 128 bytes is necessarily added to one data stream without being divided and added to two data streams. When the size of a certain data stream exceeds an upper limit size as a result of adding certain compressed data to the certain data stream, the CPU 54 adds the certain compressed data to the next data stream of the certain data stream without adding the certain compressed data to the certain data stream.

The ECC frame has a fixed size. Since the compressed data is variable-length data, the size of the data stream needs to be the upper limit size or less. The upper limit size varies depending on the data stream. The upper limit size of the first data stream D0 is 1120 bytes. The upper limit size of a second data stream D1 is 992 bytes+α0. α0 represents a surplus size of a difference between the upper limit size of the first data stream D0 and the actual size of the first data stream D0. The upper limit size of a third data stream D2 is 992 bytes+α1. α1 represents a surplus size of a difference between the upper limit size of the second data stream D1 and the actual size of the second data stream D1. The upper limit size of a fourth data stream D3 is 992 bytes+α2. α2 represents a surplus size of a difference between the upper limit size of the third data stream D2 and the actual size of the third data stream D2.

For example, assuming that the size of the first data stream D0 is 1110 bytes and the surplus size is 10 bytes, the CPU 54 generates the second data stream D1 having a size of 992+10=1002 bytes or less.

The CPU 54 reads the unit data stored in the write buffer 46, compresses the unit data using the compression circuit 60, and links the compressed data to generate the second to fourth data stream D1 to D3 for second to fourth ECC frames (S110). FIG. 11B illustrates an example of the data streams D0 to D3.

The CPU 54 adds IDs of the ECC frames and data locations (offsets) in the ECC frames in which the data streams D0 to D3 are included into the address conversion table 50 (FIG. 8) (S112).

The CPU 54 calculates headers H0 to H3 to be inserted into the data streams D0 to D3 (S114). A head location of the first data stream D0 is a head location of the ECC frame, and thus the header H0 is always 0. Therefore, the header H0 may not exist. However, by adding the header, the formats of the four ECC frame can be made the same. Therefore, a decoding process by the ECC decoder 66 can be unified.

Assuming that the size of the first data stream D0 is 1110 bytes, the second data stream D1 is arranged in a second half (10 bytes) area of an overlapping area (128 bytes) of the ECC frames 0 and 1. Since a head location of the second data stream D1 is at the 118 (=128-10) byte location from the head of the ECC frame 1, the header H1 is 118. Similarly, the remaining headers H2 and H3 are also generated. FIG. 11C illustrates an example of the arrangement of the data streams and the headers in the ECC frames.

The CPU 54 generates ECC parities P0 to P3 for the data streams D0 to D3 and the headers H0 to H3, respectively, and inserts the ECC parities P0 to P3 into the ECC frames 0 to 3 (S116). Two adjacent ECC frames partially overlap each other, and data of the overlapping area are used for generating the parities of the two adjacent ECC frames.

The CPU 54 writes the four ECC frames generated as described above as data of one page into the NAND flash memory 12 via the NAND I/F circuit 56 (S118). One example of the page to be written into the NAND flash memory 12 is the same as illustrated in FIGS. 6A and 6B.

Figure 12:
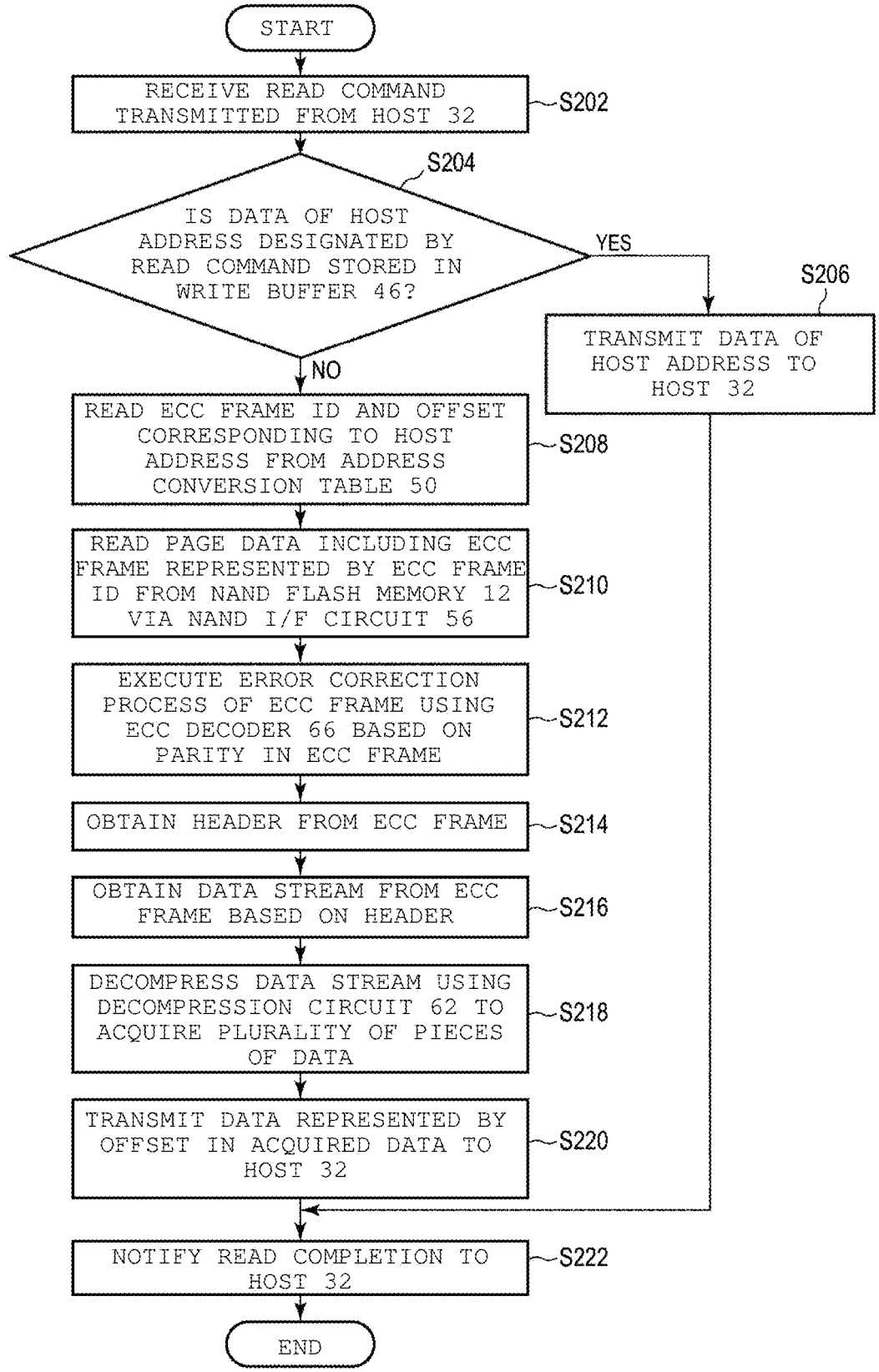
FIG. 12 is a flowchart illustrating an example of a read process according to the first embodiment.

FIG. 12 is a flowchart illustrating an example of a read process according to the first embodiment. FIGS. 13A to 13E are diagrams illustrating an example of a data decompression process according to a first embodiment.

The CPU 54 receives a read command transmitted from the host 32 (S202).

The CPU 54 determines whether data corresponding to a host address designated by the read command is stored in the write buffer 46 (S204).

When the CPU 54 determines that the data corresponding to the host address is stored in the write buffer 46 (S204; YES), the CPU 54 transmits the data to the host 32 (S206).

Figures 13A, 13B, 13C, 13D, 13E:
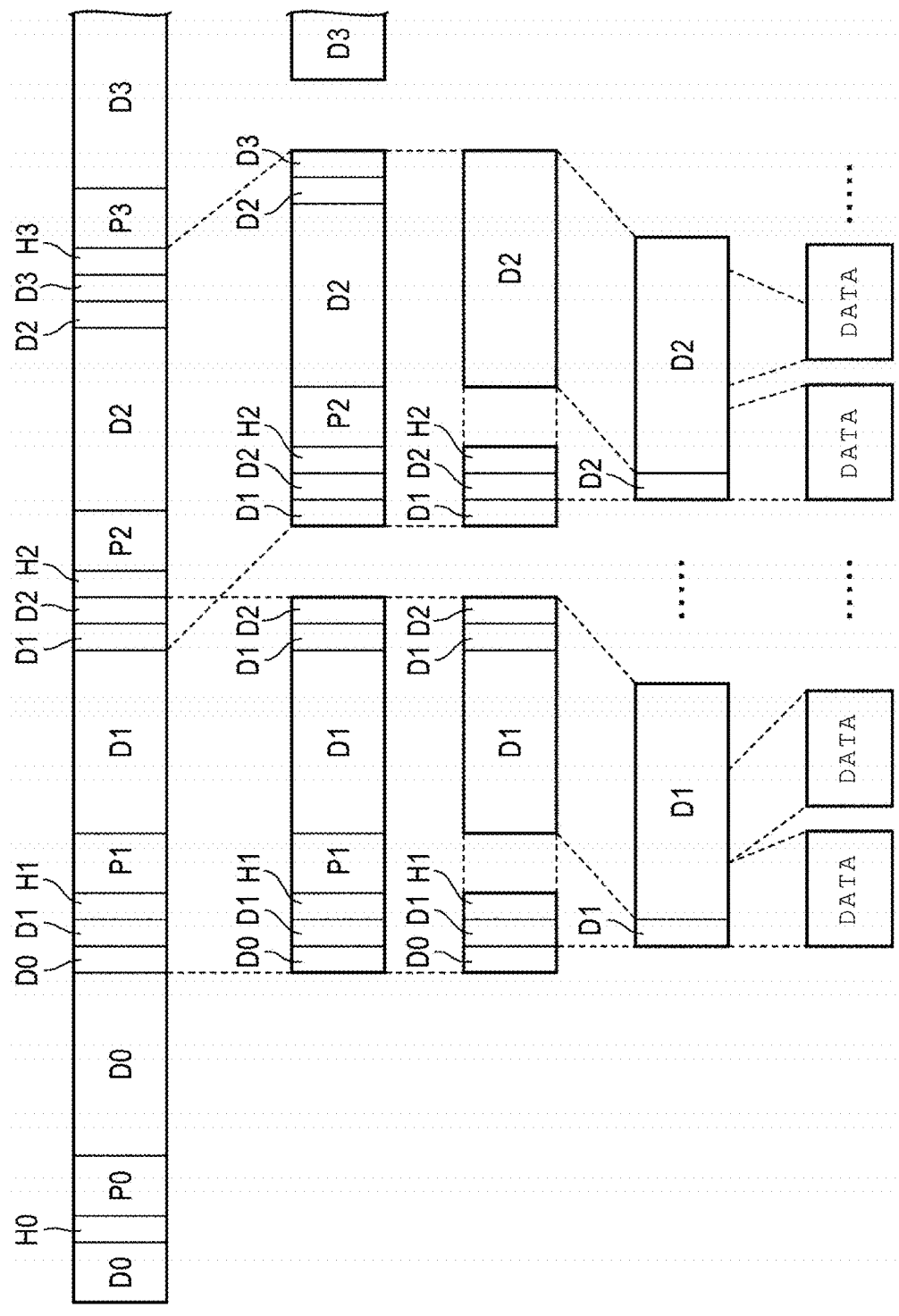
FIGS. 13A to 13E are diagrams illustrating an example of a data decompression process according to the first embodiment.

When the CPU 54 determines that the data corresponding to the host address is not stored in the write buffer 46 (S204; NO), the CPU 54 reads the ECC frame ID and the offset corresponding to the host address from the address conversion table 50 (S208). FIG. 13A illustrates an example of a page to be written into the NAND flash memory 12. FIG. 13A is the same as FIGS. 6A and 6B.

The CPU 54 reads page data including the ECC frame represented by the ECC frame ID from the NAND flash memory 12 via the NAND I/F circuit 56 (S210). FIG. 13B illustrates an example of the read ECC frames. Each of the ECC frames also includes data of adjacent ECC frames.

The CPU 54 executes an error correction process of the ECC frame using the ECC decoder 66 based on the parity in the ECC frame (S212). FIG. 13C illustrates an example of the ECC frame on which the error correction process is executed.

The CPU 54 obtains the header from the ECC frame (S214). The CPU 54 obtains the data stream from the ECC frame based on the header (S216). FIG. 13D illustrates an example of the data streams D1 and D2.

The CPU 54 decompresses the data stream using the decompression circuit 62 to acquire a plurality of pieces of data (uncompressed data) (S218). FIG. 13E illustrates an example of a plurality of pieces of uncompressed data. The decompression circuit 62 cannot recognize the end of the data stream. Therefore, an algorithm capable of decompressing data even when an accurate data size cannot be determined is used. In a method of compressing 0 of 8 bytes into 1 bit, even when the size of compressed data cannot be determined, the decompression process can be executed. When a decompression method that requires an accurate size of compressed data is used, a data arrangement where the overlapping area includes the header may be adopted.

The CPU 54 refers to the address conversion table 50, selects data represented by the offset in the acquired data, and transmits the selected data to the host 32 (S220).

The CPU 54 notifies read completion to the host 32 (S222). The notification may be skipped.

In the memory system 10 according to the first embodiment, even when surplus uncompressed data is acquired by decompressing compressed data in a situation where the end of the compressed data is not recognized, an offset representing valid data is written in the address conversion table 50 at the stage of the write process. Therefore, the selection of surplus uncompressed data can be prevented. Thus, the memory system 10 can transmit only correct data to the host 32 (S220).

In the first embodiment, the ECC frames include the overlapping area, and the overlapping area includes the data streams of two ECC frames. Therefore, the ECC frames can effectively use the storage area without including the invalid area.

Second Embodiment

FIGS. 14A and 14B are diagrams illustrating a specific example of a configuration of ECC frames in a memory system 10 according to a second embodiment. In the first embodiment, the ECC frame other than the overlapping area includes the parity. In the second embodiment, two types of parities p and P are calculated. The overlapping area includes the parity p of the second type. The ECC frame other than the overlapping area includes the parity P of the first type and the parity p of the second type. An example of the parity p of the second type is a horizontal parity. An example of the parity P of the first type is a vertical parity.

As in FIGS. 1, 6A and 6B, one page includes four ECC frames, and two adjacent ECC frames in the four ECC frames overlap each other. In each of the ECC frames, the data stream D is divided into areas having a predetermined size. The area of the ECC frame other than the overlapping area includes data of the plurality of divided areas. The memory system 10 calculates the horizontal parity p for each of the divided areas. The horizontal parity p is adjacent to data of the divided area. The overlapping area of the ECC frame 0 includes an end portion of a data stream 0 and a head portion of a data stream 1. The size of data DO of the head of the ECC frame 0 is the same as the size of data in the overlapping area. The memory system 10 calculates the vertical parity P0 for the data streams 0 and 1 in the ECC frame 0. The vertical parity P0 is adjacent to the parity p of the data DO of the head in the ECC frame 0. In the ECC frames 1 to 3, the vertical parity P1, P2, and P3 are adjacent to the corresponding overlapping areas at the heads of the ECC frames 1, 2, and 3, respectively.

In the second embodiment, the overlapping area includes the horizontal parity p that is shared by the two ECC frames. Therefore, a parity that is used for one ECC frame and a parity that is used for another ECC frame do not need to be separately stored, and the size of the parity can be reduced.

Third Embodiment

FIG. 15 is a diagram illustrating a specific example of a configuration of ECC frames in a memory system 10 according to a third embodiment. In the first and second embodiments, the four ECC frames are linked to each other using the overlapping area. However, in the third embodiment, two ECC frames are linked to each other using the overlapping area. FIG. 15 illustrates a specific example of a configuration of ECC frames 0 and 1.

The ECC frame 0 includes data streams D0 and D1 and a parity P0. The parity P0 is calculated from the data streams D0 and D1, and the size of the parity P0 is fixed. A head portion of the ECC frame 0 includes the parity P0. The overlapping area includes an end portion of the data stream D0 and a head portion of the data stream D1. The parity P0 and the data streams D0 and D1 are arranged in ascending order of address. As a result, the parity P0 and the data streams D0 and D1 are written and read in this order.

The ECC frame 1 includes the data streams D0 and D1 and a parity P1. The parity P1 is calculated from the data streams D0 and D1, and the size of the parity P1 is fixed. An end portion of the ECC frame 0 includes the parity P1. The overlapping area includes the end portion of the data stream D0 and the head portion of the data stream D1. The parity P1 and the data streams D1 and D0 are arranged in descending order of address. As a result, the parity P1 and the data streams D1 and D0 are written and read in this order. Alternatively, the parity P1 and the data streams D1 and D0 may be written and read in ascending order of address, and the data order may be changed at the stage of, for example, the ECC process.

In the third embodiment, the head location of a data stream D1 is shifted from an end portion of the ECC frame 1 by the amount of the parity. Therefore, the header is unnecessary, and the storage capacity increases.

Even in the example of FIG. 15, although the end location or the size of the data stream cannot be determined, as described in the first embodiment, there is no problem as long as a decompression algorithm capable of decompressing data without using an accurate data size is used.

Fourth Embodiment

In the above-described embodiments, when a certain ECC frame is read, a part of a data stream of an adjacent ECC frame is also read. Therefore, when one ECC frame is read, the amount of data transmitted from the NAND flash memory 12 to the controller 42 slightly increases. However, when the ECC frames including the overlapping area are continuously read, the amount of data transmitted from the NAND flash memory 12 to the controller 42 can be reduced by reading the overlapping area only once.

Figure 16:
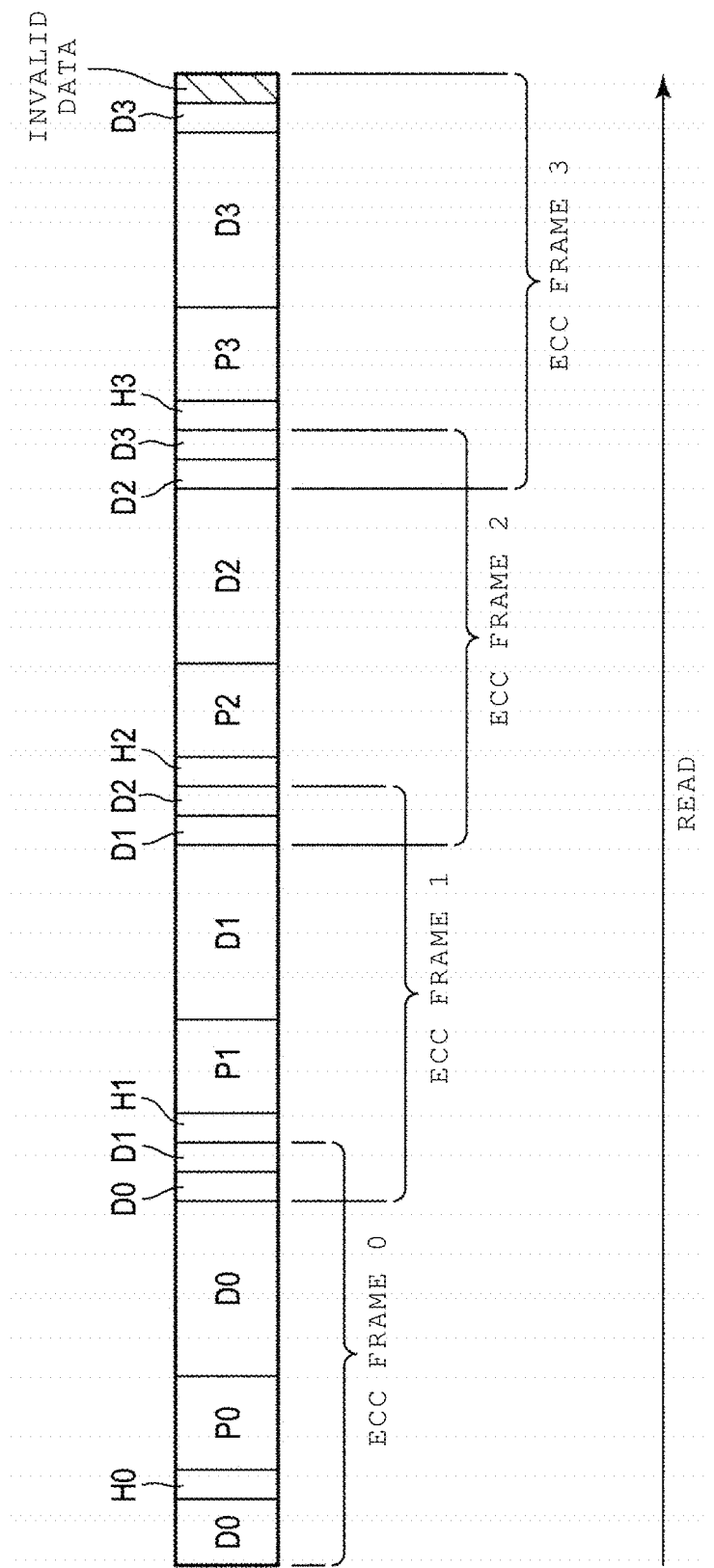
FIG. 16 is a diagram illustrating an example of an operation of sequentially reading four continuous ECC frames in a fourth embodiment.

FIG. 16 is a diagram illustrating an example of an operation of sequentially reading four continuous ECC frames 0 to 3 in the fourth embodiment. After reading up to the end of the ECC frame 0, the memory system 10 starts reading from the header H1 adjacent to the overlapping area of the ECC frame 1. After reading up to the end of the ECC frame 1, the memory system 10 starts reading from the header H2 adjacent to the overlapping area of the ECC frame 2. After reading up to the end of the ECC frame 2, the memory system 10 starts reading from the header H3 adjacent to the overlapping area of the ECC frame 3.

As such, in each of the ECC frames, the overlapping area positioned in the head portion is read only once without being read twice, and the amount of data transmission can be reduced by three times the size of the overlapping area.

Two or more embodiments among the first embodiment to the fourth embodiment may be combined.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a nonvolatile memory device; and
a controller configured to generate page data of a first predetermined size, which includes a plurality of error correction frames, each of which has a second predetermined size, and write the generated page data into the nonvolatile memory device, wherein
the plurality of error correction frames in the generated page data includes a first error correction frame and a second error correction frame subsequent thereto,
the first error correction frame includes first data and a first error correction data for correcting the first data,
the second error correction frame includes second data and a second error correction data for correcting the second data,
the first error correction frame and the second error correction frame partially overlap with each other, and
an overlapping area of the first and second error correction frames includes a part of the first data and a part of the second data.

2. The memory system according to claim 1, wherein a non-overlapping area of the first error correction frame includes a remaining part of the first data and the first error correction data.

3. The memory system according to claim 1, wherein a size of the first data is different from a size of the second data.

4. The memory system according to claim 1, wherein the second error correction frame further includes a header that contains an address of the nonvolatile memory device corresponding to a leading part of the second data.

5. The memory system according to claim 4, wherein the header is included in the overlapping area of the first and second error correction frames.

6. The memory system according to claim 1, wherein a size of the overlapping area is a third predetermined size.

7. The memory system according to claim 6, wherein the controller includes a compression circuit configured to compress data of a fourth predetermined size into the first data and another data of the fourth predetermined size into the second data, the fourth predetermined size being equal to or less than the third predetermined size.

8. The memory system according to claim 1, wherein
the plurality of error correction frames in the generated page data includes a third error correction frame subsequent to the second error correction frame,
the third error correction frame includes third data and a third error correction data for correcting the third data,
the second error correction frame and the third error correction frame partially overlap with each other,
an overlapping area of the second and third error correction frames includes a part of the second data and a part of the third data.

9. The memory system according to claim 1, wherein the controller includes:
an encoder circuit configured to generate the first error correction data based on the first data and the second error correction data based on the second data.

10. The memory system according to claim 9, wherein the controller includes:
a decoder circuit configured to perform an error correction of the first data using the first error correction data and an error correction of the second data using the second error correction data.

11. The memory system according to claim 1, wherein the controller includes:
an encoder circuit configured to generate the first error correction data based on the first data and the part of the second data included in the overlapping area, and the second error correction data based on the second data and the part of the first data included in the overlapping area.

12. The memory system according to claim 11, wherein the controller includes:
a decoder circuit configured to perform an error correction of the first data and the part of the second data included in the overlapping area using the first error correction data and an error correction of the second data and the part of the first data included in the overlapping area using the second error correction data.

13. The memory system according to claim 11, wherein
the encoder circuit is configured to generate a fourth error correction data with respect to the part of the first data and the part of the second data included in the overlapping area, and
the overlapping area includes the fourth error correction data.

14. The memory system according to claim 13, wherein
the controller is further configured to divide the first data in a non-overlapping area of the first error correction frame into a plurality of first subunits, and divide the second data in a non-overlapping area of the second error correction frame into a plurality of second subunits,
the encoder circuit is configured to generate a fifth error correction data with respect to each of the plurality of first subunits and a sixth error correction data with respect to each of the plurality of second subunits,
the first error correction frame includes the plurality of first subunits and the fifth error correction data of each of the plurality of first subunits, and
the second error correction frame includes the plurality of second subunits and the sixth error correction data of each of the plurality of second subunits.

15. The memory system according to claim 14, wherein
each of the first and second error correction data is a vertical parity, and
each of the fourth, fifth, and sixth error correction data is a horizontal parity.

16. The memory system according to claim 1, wherein in the overlapping area, an order of the first data is different from an order of the second data.

17. The memory system according to claim 1, wherein the controller is further configured to read the overlapping area once when the controller reads the first error correction frame and the second error correction frame.

18. A method comprising:
- generating page data of a first predetermined size, which includes a plurality of error correction frames, each of which has a second predetermined size; and
- writing the generated page data into a nonvolatile memory device, wherein
- the plurality of error correction frames in the generated page data includes a first error correction frame and a second error correction frame subsequent thereto,
- the first error correction frame includes first data and a first error correction data for correcting the first data,
- the second error correction frame includes second data and a second error correction data for correcting the second data,
- the first error correction frame and the second error correction frame partially overlap each other, and
- an overlapping area of the first and second error correction frames includes a part of the first data and a part of the second data.

19. The method according to claim 18, wherein the second error correction frame further includes a header that contains an address of the nonvolatile memory device corresponding to a leading part of the second data.

20. The method according to claim 18, wherein
- a size of the overlapping area is a third predetermined size,
- the controller includes a compression circuit configured to compress data of a fourth predetermined size into the first data and another data of the fourth predetermined size into the second data, the fourth predetermined size being equal to or less than the third predetermined size.

* * * * *